United States Patent [19]
Johnson

[11] Patent Number: 6,038,331
[45] Date of Patent: Mar. 14, 2000

[54] APPARATUS AND METHOD FOR MONITORING HAND WASHING

[76] Inventor: Raymond C. Johnson, 337 Penshurst Pl., Chesterfield, Mo. 63017

[21] Appl. No.: 09/024,494

[22] Filed: Feb. 17, 1998

Related U.S. Application Data

[60] Provisional application No. 60/038,848, Feb. 18, 1997.

[51] Int. Cl.[7] .................................................. G06K 9/00
[52] U.S. Cl. ........................ 382/100; 382/173; 134/113
[58] Field of Search .................................. 382/100, 115, 382/173, 180; 348/143; 4/619, 638, 661; 134/18, 56 R, 57 R, 58 R, 113; 604/289, 290

[56] References Cited

U.S. PATENT DOCUMENTS

| | | | |
|---|---|---|---|
| 4,688,585 | 8/1987 | Vetter | 134/56 R |
| 5,199,118 | 4/1993 | Cole et al. | 4/619 |
| 5,296,942 | 3/1994 | Yokoyama et al. | 358/461 |
| 5,341,226 | 8/1994 | Shiau | 358/518 |
| 5,573,041 | 11/1996 | Skell et al. | 141/1 |
| 5,631,976 | 5/1997 | Bolle et al. | 382/174 |
| 5,670,945 | 9/1997 | Applonie | 340/573 |
| 5,793,653 | 8/1998 | Segal | 364/569 |
| 5,954,069 | 9/1999 | Foster | 134/57 R |
| 5,960,991 | 10/1999 | Ophardt | 222/1 |

FOREIGN PATENT DOCUMENTS

| | | | |
|---|---|---|---|
| 0616658 | 5/1993 | European Pat. Off. | E03C 1/046 |
| 1-219439 | 9/1989 | Japan | F24F 7/06 |
| 6-212670 | 8/1994 | Japan | E03C 1/042 |

OTHER PUBLICATIONS

"Simple Hand Washing Gets New Scrutiny For Disease Control", *The Wall Street Journal*, Feb. 5, 1996, Chase, p. B1.
"Foodservice Sanitation: It's All In The Touch", *Maintenance Supplies*, Oct. 1996, pp. 64–66.
"New UltraClenz Touch–Free Hand Washing System Combats Deadly Food–Borne and Hospital–Acquired Infections," UltraClenz Corporation Press Release, Jul. 17, 1996, from URL: http://www.ultraclenz.com/pressrel.htm.
Maney, "Bathrooms Flush with Tech Opportunity," USA Today, May 22, 1997, p. 4B.
Hygiene Guard description from the Captology website, Stanford University, at URL: http://www–pcd.stanford.edu/captology/resources/cep/catalog/hg.html, printed Nov. 2, 1999.

Primary Examiner—Andrew W. Johns
Attorney, Agent, or Firm—Grace J. Fishel

[57] ABSTRACT

An apparatus and method for monitoring hand washing wherein a subject's hands are checked after he or she has applied soap or detergent and spread it over the front and back of his or her hands. An optical image of the subject's hands is digitized and compared, pixel by pixel, with a reference feature that distinguishes the soap and a report is generated indicating whether the subject's hands are covered with enough soap or detergent to receive a satisfactory report.

10 Claims, 2 Drawing Sheets

APPARATUS AND METHOD FOR MONITORING HAND WASHING

This application claims the benefit of U.S. Provisional Application No. 60/038,848, filed Feb. 18, 1997.

BACKGROUND OF THE INVENTION

1. Field of the Invention

The present invention relates to an apparatus and method for monitoring hand washing. A soap with a particular feature (e.g., color and opaqueness) that allows it to be differentiated from a user's hands and a background is also disclosed.

2. Brief Description of the Prior Art

According to Restaurant News, "The unwashed or poorly washed hands of food service workers leads to an estimated 12.5 million cases of food borne illnesses in the U.S. each year." Recent outbreaks and deaths due to salmonella and E. coli food poisoning have re-focused industries' attention on the on-going neglect of proper hand washing by food service employees.

Food service establishments have rules concerning hand washing but the honor system does not work. An employee could be posted in each rest room to oversee washing but this is costly and raises privacy issues. What is needed is an effective method to monitor compliance.

There is only one hand washing monitoring system on the market at the present time. The system is sold by UltraClenz Corporation and comes with a digital readout screen that leads employees step by step through a complete "hand washing cycle."

The UltraClenz system controls hot and cold water valves on an accompanying stainless steel sink dedicated to hand washings. An employee enters his or her identification number into the system's keyboard and a readout screen instructs the employee to wet his or her hands. Water flows automatically from the faucet for 10 seconds, after which the employee is instructed to "Apply soap" by placing his or her hands below a dispenser. The employee is then supposed to lather and scrub for a recommended 20-second period. If the employee avoids the "Apply Soap" phase, the program will shut down and must be re-initiated by entering the employee's identification code. What the employee does with the soap and whether he or she lathers and scrubs is not monitored. The 20-seconds are displayed as a "count-down" on the monitor and, at the end of the period, the water is automatically turned on again for rinsing. When the rinse water stops, the employee is instructed to dry his or her hands thoroughly. Completion of the "hand washing cycle" is confirmed and registered when an employee waves his or her hand in front of an electronic sensor.

While the focus of the discussion has been on food service workers, a rash of reports in the Journal of the American Medical Association, Lancet and other medical journals cite studies linking the breakdown of basic hygiene to outbreaks of bacterial and viral illness in hospitals, nursing homes and child-care centers. An effective method for monitoring hand washing in these institutions would also be useful.

SUMMARY OF THE INVENTION

In view of the above, it is an object of the present invention to provide an effective apparatus and method for monitoring hand washing. It is another object to provide documentation that demonstrates "reasonable care" and "due diligence" if an employer is held accountable in litigation for employee spread disease. Other objects and features of the invention will be in part apparent and in part pointed out hereinafter.

In accordance with the invention, an employee, after being identified, is checked for the application of soap to his or her hands by converting an optical image of the soaped hands against a background into a digital image which is inputted to a computer. A first reference feature, such as color or texture, is identified that distinguishes the background from the soap and from the subject's hands and a second reference feature is identified that distinguishes the soap from the background and from the subject's hands. An algorithm executing in the computer compares the digitized image, pixel by pixel, with the first and second reference characteristics. The algorithm accumulates the number of pixels matching the second reference characteristic, indicating the area to which soap is applied, and the number matching neither the first or second reference characteristic, indicating the area of the hands to which soap has not been applied, calculates the amount of area to which soap has been applied compared with the area of the hands to which soap has not been applied and compares that with a predetermined level of required coverage. If the area to which soap has been applied is less than the level of coverage required to pass, the subject is given an unsatisfactory report and is instructed to try again.

Documentation is kept automatically. A soap for use in accordance with the present invention must have a particular feature (e.g., color and opaqueness) to be differentiable from the user's hands and the background.

BRIEF DESCRIPTION OF THE DRAWINGS

In the accompanying drawings, in which one of various possible embodiments of the invention are illustrated, corresponding reference characters refer to corresponding parts throughout the several views of the drawings in which.

DETAILED DESCRIPTION OF THE INVENTION

Figure 1:
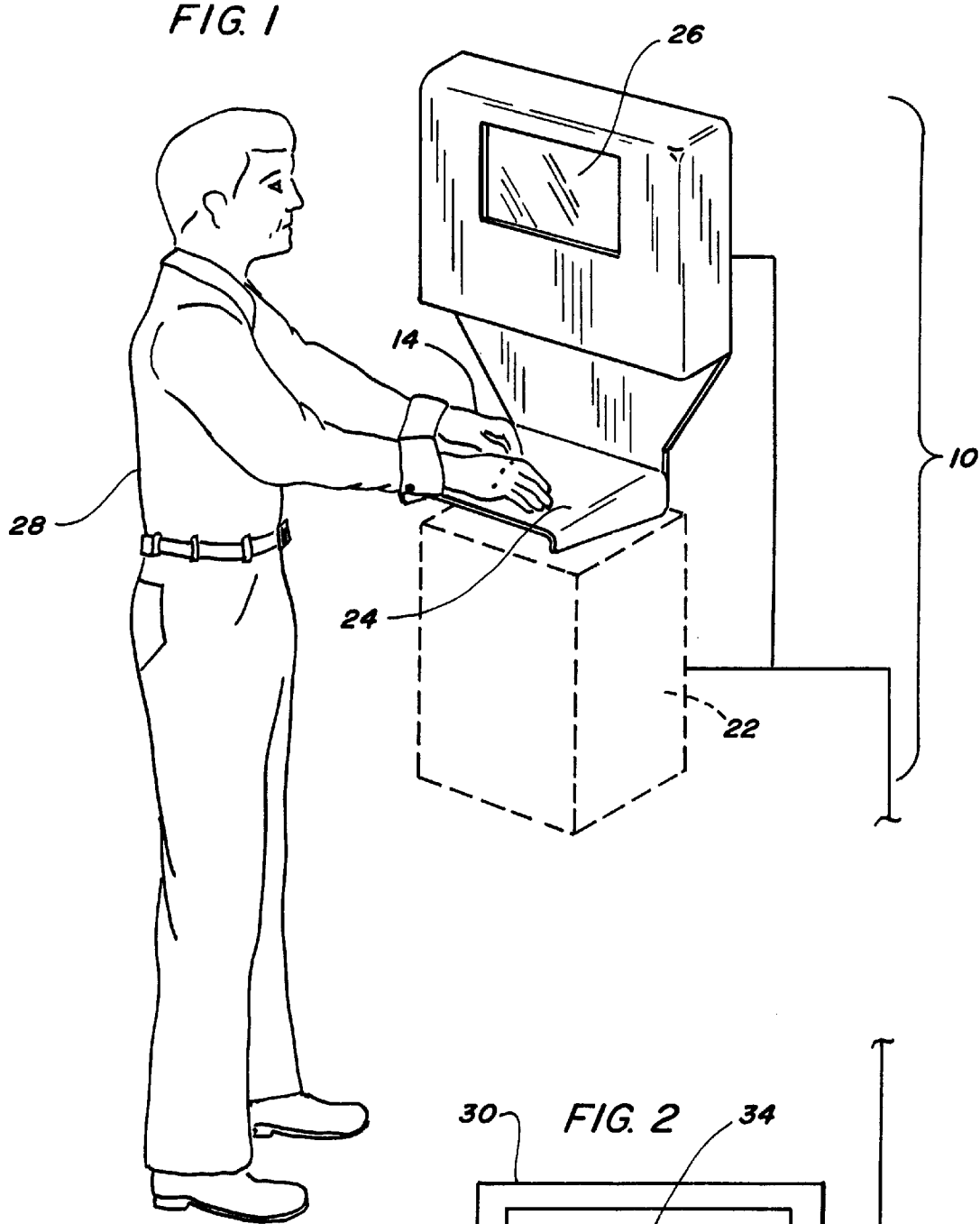
FIG. 1 illustrates an apparatus for monitoring hand washing in accordance with the present invention in use.
Figure 2:
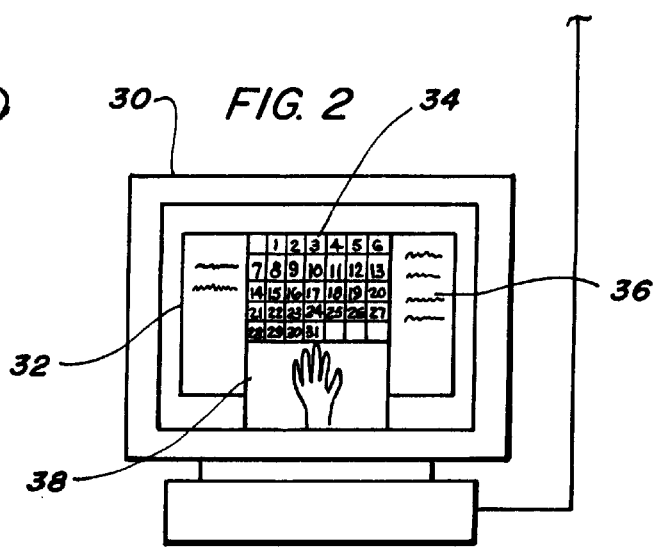
FIG. 2 is shows a monitor allowing management to review reports made by the apparatus.

Referring to the drawings more particularly by reference character, reference numeral 10 refers to an apparatus for monitoring hand washing in accordance with the present invention. In major part, apparatus 10 includes an input device 12 in front of which a subject places his or her hands 14 after he or she has applied and spread a layer of soap or detergent 16 over the front and back of his or her hands. A light source 18 may be provided for illuminating the subject's hands. Input device 12 converts light reflected from soap 16 and hands 14 into an optical image. A device 20 digitizes the optical image into a plurality of pixels which are processed in a computer 22 as more particularly described below.

A reference feature that distinguishes soap 16 from hands 14 is stored in the computer. The reference feature can be any property of the soap which can be computationally extracted. Reference features include, but are not limited to, color and texture. Pattern matching can be used to help assure that a human hand and potentially who's hand is presented to the apparatus. Identifying the shape of the object presented to apparatus 10 as including fingers will help ensure that some other foreign object was not placed in the input device's view.

Texture mapping can be used to supplement or replace color identification by storing an image of each employee's hands without soap. The texture of the image with soap will be different enough to aid in soap detection. Using textures in addition or as a replacement for color identification should provide an increase in soap detection accuracy.

When the reference feature is color, it is preferred that the subject place his or her hands in front of a background 24 so that the optical image includes the background and the subject's soaped hands. Input device 12 can be a digital color camera into which digitizer 20 is integrated. A first reference feature is provided that distinguishes the background from the soap and the subject's hands and a second reference feature is provided that distinguishes the soap from the background and the subject's hands. Since human hands 14 are primarily red or brown in color, background 24 is preferably blue and soap 16 green or vice versa. The reference feature of background 24 is determined by the following steps:

A. Digitizing an optical image including only the background.

B. Converting each pixel's RGB (Red, Green and Blue) values to a color space such as HSV (Hue, Saturation and Value).

C. Filtering out all colors which are not a derivative of blue or green into color space or HSV values.

D. Creating a list of unique color space or HSV values which were not filtered out and counting the occurrences of each.

E. For each unique color space or HSV value allowing for small percentage differences in the hue, saturation and brightness. The percentage being different for each color space or HSV value.

F. Starting from the most common color space or HSV value based upon occurrence in step D, clustering the color space or HSV values by using the percentage range from step E and building a list of ranges/clusters which include all background colors measured.

G. Identifying shadow color ranges based upon the background color ranges. The color space or HSV value ranges for shadow are precomputed and supplemented by the background color ranges. In other words, the actual color of the shadow is dependant upon the color of the background and other objects. The precomputed color space or HSV ranges are obtained by examining the color space or HSV values for shadows using various background colors.

The reference feature of soap 16 is determined by processing an image which is comprised of background and mostly soap. To image properly, the soap must have a certain amount of opaqueness and a color quality that allows it to be adequately distinguished on a hand by input device 12. This image can be of a human hand covered with the expected soap or can be soap in an open flat container. The percentage of the image which is not background must contain a preponderance of soap to get an accurate reading of the soap colors and it is preferred that at least 65% of the image be soap, and less than 35% uncovered hand or container. Identification of the soap color ranges is almost identical to that of identifying the background color ranges and includes the following steps:

A. Converting each pixel's RGB values to color space or HSV.

B. Filtering out color space or HSV values which are background or shadow. If the color space or HSV values fall within a background or shadow color space or HSV range, then it is considered background or shadow. Filtering out colors which are not based on blue or green. Again the background must be either blue or green, and the soap color should be the other color not used. The background and soap do not have to be exactly blue or green, but the closer to true blue or true green, the better.

C. Creating a list of unique color space or HSV values which were not filtered out and counting the occurrence of each.

D. Starting from the most common color space or HSV value based upon occurrence from step C, clustering the color space or HSV values by allowing small percentage differences in color space or HSV. Building up a list of ranges/clusters which include all soap colors.

E. Examining the ranges for the soap colors, identifying any outliers by occurrence and proximity to the bulk of the ranges. This is performed due to the soap can be presented on human hands or in an open container, which filters out the color ranges which are most likely the hand or container. In this step it is preferred that at least 65% of the non-background colors be soap. This step uses 65–98% of the color ranges to identify the soap, the 2–35% is assumed to be some other object besides soap.

The first and second reference features are stored in computer 22. An algorithm executed in the computer compares the digitized image of the subject's hands in front of the background and compares it, pixel by pixel, with the first and second reference features and accumulates the number of pixels that match the first reference feature, indicating the area to which soap is applied, or that matches neither reference feature, indicating the area of the hands to which soap has not been applied. The algorithm may then calculate whether the number pixels matching the second reference feature plus those matching neither reference feature divided by the number of pixels matching the first reference feature are less than a predetermined amount, e.g., 30%, creating a report that too much of the image is background. The algorithm then calculates whether the number of pixels matching the second reference feature out of the total number of pixels matching the second reference feature plus the number of pixels matching neither reference feature is greater than a predetermined level of coverage and creates a report that is sent through the output. A coverage of 50% is easy to obtain, while 85% is more difficult. The predetermined level of coverage is configurable by the manager.

If lighting conditions confuse input device 12 (i.e., shadows are taken as part of the hand), a lower percentage of coverage may be required to pass (e.g., about 70%). Reducing the required percentage of coverage also provides a margin of error if part of the user's wrist is included in the optical image. There are other ways to cancel the effect of shadows or the inclusion of the wrist. For example, the effect of shadows could be canceled by scanning the user's hands at two wavelengths, one in the infrared which would not be fooled by lighting conditions. The effect of including the user's wrist could be canceled by comparing the image with known hand proportions. For example, if the average length of a hand is twice the length of the index finger, the image of the user's hand could be truncated at that distance thereby eliminating the effect of including the wrist.

Figure 3:
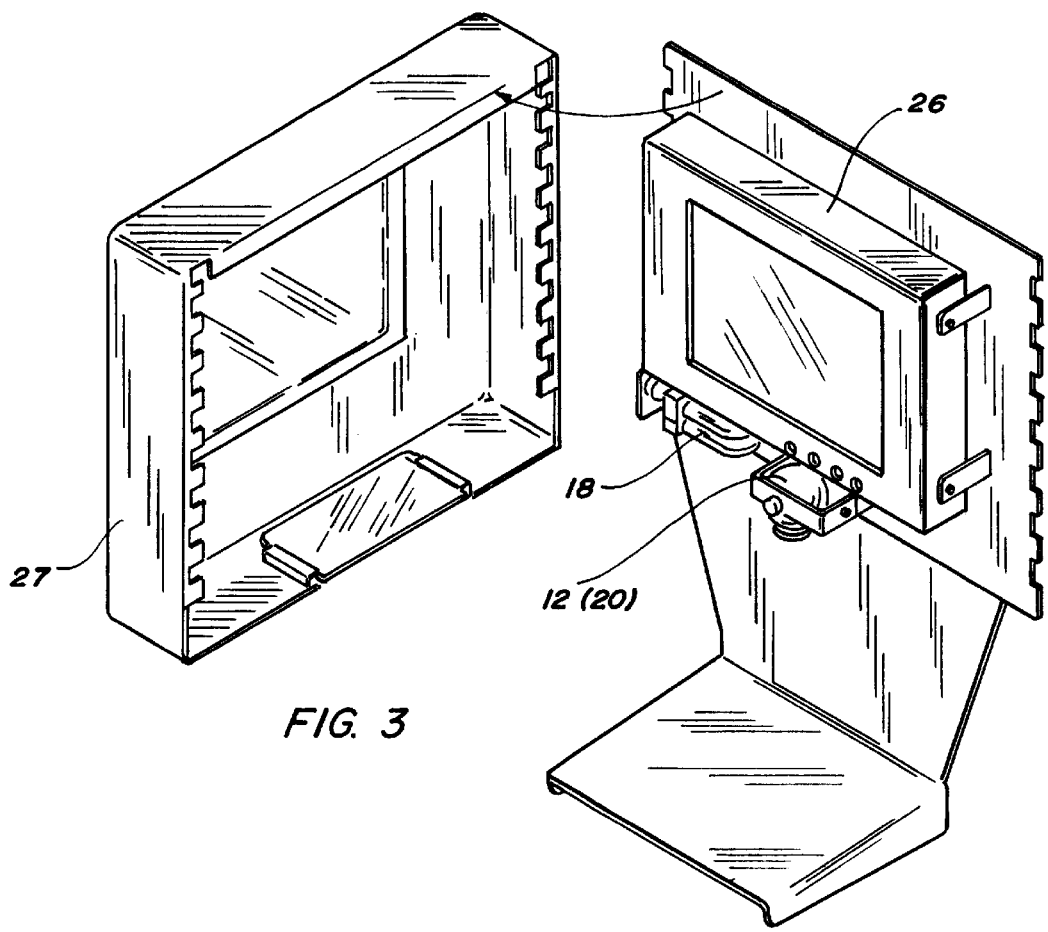
FIG. 3 is an exploded perspective view of that portion of the apparatus including a background in front of which a subject may display his hands, an input monitor with an integrated digitizer, and a video monitor for displaying the results; and, FIG. 4 is an enlarged view of a digitized optical image of one of the subject's hands and a second digitized image showing those portions of his or her hands covered with soap.
Figure 4:
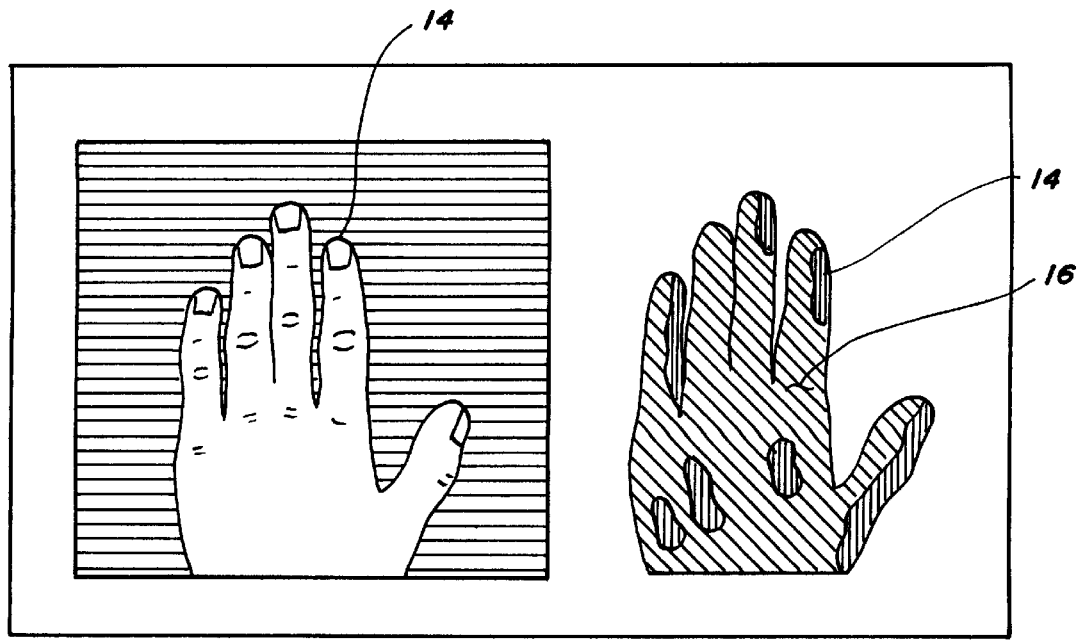

A video monitor 26 in view of the subject may be provided for displaying the report as to whether the subject's hands were covered with the required percentage of soap to pass. In addition to satisfying the employee's desire to see the results, the presence of the monitor will have a public relations effect on customers and patients who will be pleased to see that employees are tested for hand washing. The algorithm in computer 22 may create a second digitized image from the optical image containing only those pixels that match the second reference feature, indicating the area to which soap is applied, or that match neither reference feature, indicating the area of the hands to which soap has not been applied. The second digitized image is outputted from the computer in a form that the areas are visually distinguishable when displayed on video monitor 26. As shown in FIG. 3, monitor 26, light source 18, input device 12 and digitizer 20 integrated with input device 12 may be housed in a box with a removable face panel 27.

Apparatus 10, as more particularly described below, may be connected to a detector which identifies subject 28 when he or she enters a rest room. Each employee may be outfitted with a optically scannable bar code or with an ID that be read with a radio frequency transponder (RFID) or the like. When subject 28 enters the room, the detector identifies the employee and sends a signal to computer 22 which initiates operation of apparatus 10. To avoid an unsatisfactory management report, subject 28 must pass inspection by apparatus 10 before he or she leaves the rest room. If more than one person can be in the rest room at a time, a second detector may be provided for the purpose of identifying the employee as the employee approaches the sink. Every time the employee enters the rest room, the employee must wash his or her hands even if the employee is only in the room for the purpose of combing his or her hair.

Input device 12 is preferably located close to a soap dispenser. To pass inspection, subject 28 must take a dose of soap and rub it over the back and front of his hands. If input device 12 detects that a prescribed percentage of the user's hands have been coated with soap, monitor 26 instructs the user to wash his or her hands. System 10 can be adapted to simultaneously view the front and back of the user's hands or it can be designed to monitor only one side.

Once monitor 26 signals subject 28 that he or she has passed inspection, the user will lather and scrub for the recommended 20-second period set out by FDA food safety recommendations, and possibly longer, to get the soap off his or her hands. By changing the rheology, etc. of the liquid soap, the amount of scrubbing and rinsing it takes to remove the soap can be regulated, thereby extending or shortening the period of time the user must spend lathering and scrubbing. If the employee tries to rub the soap off on a paper towel or on his or her clothes, enough soap will be left on the employee's hands to be uncomfortable, promoting lathering and rinsing as described above. And even if he or she avoids the water, the bacterial soap on the employee's hands will have done its work.

The reports are stored in computer 22 where they can be called up for management review on a second monitor 30. By clicking on an employee's name in frame 32, the days that he had rest room activity are shown in frame 34. The level of activity (i.e., how many times he or she used the rest room) may be indicated by varying the intensity of the numbers of the active days. A list of rest room activity by date appears in frame 36. If the manager clicks on a date, the original digitized optical image of the subject's hands will appear in frame 38 or the second digitized image showing the subject's hands and those areas covered with soap will appear.

In view of the above, it will be seen that the several objects of the invention are achieved and other advantageous results attained. As various changes could be made in the above constructions and methods without departing from the scope of the invention, it is intended that all matter contained in the above description or shown in the accompanying drawings shall be interpreted as illustrative and not in a limiting sense.

What is claimed:

1. An apparatus for monitoring hand washing comprising
an input device in front of which a subject places his or her hands after he or she has applied and spread a layer of soap or detergent over the front and back of his or her hands, said input device converting light reflected from the soap and subject's hands into an optical image,
a device for digitizing the optical image into a digitized image with a plurality of pixels,
a computer having an input for the digitized image and an output for a report,
a reference feature that distinguishes the soap from the subject's hands, said reference feature in the computer,
an algorithm executed in the computer that compares the digitized image, pixel by pixel, with the reference feature and accumulates the number of pixels that match the reference feature, indicating the area to which soap is applied, and the number of pixels that do not match the reference feature, indicating the area of the hands to which soap has not been applied, calculates whether the number of pixels matching the reference feature out of the total number of pixels matching the reference feature plus the number pixels not matching the reference feature is greater than a predetermined level of coverage, and creates a report sent through the output.

2. An apparatus for monitoring hand washing comprising
a background in front of which a subject places his or her hands after he or she has applied and spread a layer of soap or detergent over the front and back of his or her hands,
an input device for converting light reflected from the background, soap and subject's hands into an optical image,
a device for digitizing the image into a plurality of pixels,
a computer having an input for the digitized image and an output for a report,
a first reference feature that distinguishes the background from the soap and the subject's hands and a second reference feature that distinguishes the soap from the background and the subject's hands, said first and second reference features stored in the computer,
an algorithm executed in the computer that compares the digitized image, pixel by pixel, with the first and second reference features and accumulates the number of pixels that match the first reference feature, indicating the area to which soap is applied, or that matches neither reference feature, indicating the area of the hands to which soap has not been applied, calculates whether the number of pixels matching the second reference feature out of the total number of pixels matching the second reference feature plus the number pixels matching neither reference feature is greater than a predetermined level of coverage, and creates a report sent through the output.

3. The apparatus of claim 2 further comprising a video monitor in view of the subject for displaying the report.

4. The apparatus of claim 3 wherein the algorithm creates a second digitized image from said first digitized image, said second digitized image containing only those pixels that match the second reference feature, indicating the area to which soap is applied, or neither reference feature, indicating the area of the hands to which soap has not been applied, said second image in a form that the areas are visually distinguishable on a monitor, said second digitized image displayed on the video monitor.

5. The apparatus of claim 4 wherein the first digitized image is displayed on the video monitor for visual comparison with the second digitized image.

6. The apparatus of claim 2 further comprising a light source for illuminating a subject's hands against the background.

7. A method for monitoring hand washing comprising having a subject place his or her hands in front of a background after he or she has applied and spread a layer of soap or detergent over the front and back of his or her hands, converting light reflected from the background, soap and subject's hands into an optical image, digitizing the image into a digitizing image with a plurality of pixels, identifying a first reference feature that distinguishes the background from the soap and the subject's hands and a second reference feature that distinguishes the soap from the background and the subject's hands, said first and second reference features in a computer, and, executing an algorithm in the computer that compares the digitized image, pixel by pixel, with the first and second reference features and accumulates the number of pixels that match the first reference feature, indicating the area to which soap is applied, or that matches neither reference feature, indicating the area of the hands to which soap has not been applied, calculates whether the number of pixels matching the second reference feature out of the total number of pixels matching the second reference feature plus the number pixels matching neither reference feature is greater than a predetermined level of coverage, and creates a report.

8. The method of claim 7 further comprising displaying the report on a video monitor in view of the subject.

9. The method of claim 8 wherein the algorithm creates a second digitized image from said first digitized image, said second digitized image containing only those pixels that match the second reference feature, indicating the area to which soap is applied, or neither reference feature, indicating the area of the hands to which soap has not been applied, said second image in a form that the areas are visually distinguishable on a monitor, said second digitized image displayed on the video monitor.

10. The method of claim 9 wherein the first digitized image is displayed on the video monitor for visual comparison with the second digitized image.

* * * * *